US011418588B2

(12) United States Patent
Fong et al.

(10) Patent No.: US 11,418,588 B2
(45) Date of Patent: Aug. 16, 2022

(54) INTELLIGENT PEER-TO-PEER CONTAINER FILESYSTEM

(71) Applicant: EMC IP Holding Company LLC, Hopkinton, MA (US)

(72) Inventors: Victor Fong, Medford, MA (US); Xuebin He, Westwood, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/036,206

(22) Filed: Sep. 29, 2020

(65) Prior Publication Data

US 2022/0103623 A1 Mar. 31, 2022

(51) Int. Cl.
*H04L 67/1074* (2022.01)
*H04L 67/1061* (2022.01)
*H04L 67/1042* (2022.01)

(52) U.S. Cl.
CPC ...... *H04L 67/1076* (2013.01); *H04L 67/1042* (2013.01); *H04L 67/1063* (2013.01); *H04L 67/1078* (2013.01)

(58) Field of Classification Search
CPC ............. H04L 67/1076; H04L 67/1063; H04L 67/1078; H04L 67/1042
See application file for complete search history.

(56) References Cited

U.S. PATENT DOCUMENTS

| | | | |
|---|---|---|---|
| 6,606,744 B1 | 8/2003 | Mikurak | |
| 7,009,967 B1 | 3/2006 | Hariharasubrahmanian | |
| 11,087,042 B1 | 8/2021 | Hussey | |
| 11,128,692 B2 | 9/2021 | Couleaud et al. | |
| 2002/0049760 A1* | 4/2002 | Scott | G06F 16/9014 |
| 2005/0149528 A1 | 7/2005 | Anderson et al. | |
| 2006/0036570 A1 | 2/2006 | Schaefer et al. | |
| 2006/0242685 A1 | 10/2006 | Heard et al. | |
| 2007/0064702 A1* | 3/2007 | Bates | H04L 67/104 |
| | | | 370/392 |
| 2008/0005114 A1* | 1/2008 | Li | H04L 67/2842 |
| 2008/0005195 A1* | 1/2008 | Li | G06F 16/1837 |
| 2008/0005203 A1 | 1/2008 | Bots et al. | |
| 2008/0082551 A1 | 4/2008 | Farber et al. | |
| 2008/0301140 A1 | 12/2008 | Alpern et al. | |
| 2012/0084445 A1 | 4/2012 | Brock et al. | |
| 2012/0218914 A1 | 8/2012 | Tanaka et al. | |
| 2012/0331021 A1 | 12/2012 | Lord | |
| 2013/0047149 A1* | 2/2013 | Xu | H04L 67/02 |
| | | | 717/175 |

(Continued)

FOREIGN PATENT DOCUMENTS

| | | |
|---|---|---|
| CN | 110300120 B | 7/2021 |
| WO | 2009/043037 A2 | 4/2009 |
| WO | 2012/048014 A2 | 4/2012 |

*Primary Examiner* — Aftab N. Khan
(74) *Attorney, Agent, or Firm* — Workman Nydegger (57) ABSTRACT

A peer container filesystem is provided. The peer container filesystem allows peer nodes to share containers. The peer container filesystem allows the images or portions thereof to be shared without a container registry. A node send requests to the network that are configured to push or distribute an image in the network, search for an image in the network, download an image in the network, and perform updates amongst the peer nodes such that the locations of images and/or their files are known to at least some of the peers in the network.

20 Claims, 9 Drawing Sheets

(56) References Cited

U.S. PATENT DOCUMENTS

| | | |
|---|---|---|
| 2014/0040883 A1* | 2/2014 | Tompkins ............ G06F 9/5072 |
| | | 718/1 |
| 2014/0215154 A1 | 7/2014 | Stewart et al. |
| 2014/0279846 A1 | 9/2014 | Srinivasan et al. |
| 2017/0052776 A1 | 2/2017 | Kotian |
| 2017/0109372 A1 | 4/2017 | Shimamoto |
| 2017/0177391 A1 | 6/2017 | Wagner et al. |
| 2017/0177860 A1 | 6/2017 | Suarez et al. |
| 2017/0177877 A1 | 6/2017 | Suarez et al. |
| 2017/0249141 A1 | 8/2017 | Parees et al. |
| 2018/0039524 A1 | 2/2018 | Dettori et al. |
| 2018/0110012 A1 | 4/2018 | Williams et al. |
| 2018/0137174 A1 | 5/2018 | Cahana et al. |
| 2018/0183596 A1* | 6/2018 | Deshpande ............ H04W 4/00 |
| 2018/0189121 A1 | 7/2018 | Jobi et al. |
| 2018/0189122 A1 | 7/2018 | Jobi et al. |
| 2018/0239560 A1* | 8/2018 | Venetsanopoulos ........................ |
| | | G06F 12/1072 |
| 2018/0293366 A1 | 10/2018 | Subramaniyan et al. |
| 2019/0095441 A1 | 3/2019 | Scrivano |
| 2019/0243681 A1 | 8/2019 | Chen |
| 2019/0347517 A1 | 11/2019 | Waugh et al. |
| 2019/0392050 A1 | 12/2019 | Weil et al. |
| 2020/0250363 A1 | 8/2020 | Partridge et al. |
| 2020/0409723 A1 | 12/2020 | Starks et al. |
| 2020/0409736 A1 | 12/2020 | Starks et al. |
| 2020/0409921 A1 | 12/2020 | Starks et al. |
| 2021/0234836 A1 | 7/2021 | Li et al. |

\* cited by examiner

| Image Hash 602 | Peer IP 604 |
|---|---|
| 3b027225 | [10.172.0.4, 10.172.0.75] |
| 2a5306a1 | [10.172.0.45] |
| Aa2a7916 | [10.172.0.52] |
| 92d557a7 | [10.172.0.23] |

| Image Hash 502 | Files in Image 504 |
|---|---|
| 3b027225 | [ef78b6a1, e53591da, 7786ac6d] |
| 2a5306a1 | [7786ac6d, 07371adf, e53591da] |
| Aa2a7916 | [e535991da, 07371adf] |
| 92d557a7 | [07371adf, e53591da, ef78b6a1] |

INTELLIGENT PEER-TO-PEER CONTAINER FILESYSTEM

RELATED APPLICATIONS

Embodiments of the invention relate to U.S. Ser. No. 16/778,896 filed Jan. 31, 2020 and entitled Intelligent Filesystem for Container Images, which is incorporated by reference in its entirety.

FIELD OF THE INVENTION

Embodiments of the present invention generally relate to containers, container related operations, and container related file systems. More particularly, at least some embodiments of the invention relate to systems, hardware, software, computer-readable media, and methods for sharing container images

BACKGROUND

In the context of computers and computer software, a container is essentially a self-contained application. A running container includes all components, libraries, and dependencies that are needed to execute an application. Being self-contained, the same container can be run in different computing environments. In effect, a container isolates an application from the computing environment and this isolation allows an application to be run efficiently in different computing environments. Docker is an example of a container solution and Kubernetes is an example of a container orchestration solution. Example descriptions of containers and of container orchestration solutions can be found at www.docker.com and www.kubernetes.io (the documentation provided therein are incorporated by reference in their entirety).

Container images can be large (e.g., on the order of gigabytes). The size of container images sometimes causes problems. For example, because of the manner in which containers operate, the container must be completely downloaded to the host machine before the container can execute As a result, users may experience a delay while waiting for the container image to be downloaded to the host machine.

In addition, a container image may include unnecessary files (e.g., files that are never used during execution of the container). When unnecessary files are included in a container image, the download time is longer and more storage and network resources are needed to store, start, and run the container image.

As previously stated, a container typically includes all required dependencies such that a process can run on many platforms. However, not all of these dependencies are used during the container's lifetime. In other words, a container image may include dependencies that may never be used. Further, while building the container image, artifacts related to compiling and installing operations may be generated. These artifacts are not used during execution and may contribute to the unnecessary consumption of computing resources.

One potential solution to this problem is to construct container images using layers. Layers can be shared between different container images and between running containers such that the total size of all images on the host machine is smaller than if all of the container images were stored separately. Unfortunately, different layers may maintain copies of the same file. In a container, only the files in the top layer are typically consumed. Even though the layers are shared, any duplication in the lower layers consumes storage space and transmission bandwidth. Plus, as previously stated, all layers of the image must be downloaded before the container can be started—even if some of the layers or portions thereof not used.

As a result, the ability to efficiently use containers and effectively manage computing resources is adversely impacted. Users may also experience adverse or inconvenient effects. Containers are burdened by the requirement to download all layers of an image before starting the image as previously stated. This may delay the start of the container and may impact users.

The large size of a container image also results in a longer preparation time. For example, container layers may be compressed prior to transmission. However, decompressing layers or portions thereof that are not used takes time and contributes to the preparation or start time. The larger size of a container image can impact storage requirements, particularly when a node is running hundreds or thousands of containers. Finally, the large size of containers can impact bandwidth—particularly when bandwidth is an important resource, such as in a datacenter.

The ability to run a container in many different environments makes it desirable to share container images. Currently, container images are shared using a container registry that stores container images. These images can be downloaded by hosts that are planning to run the images they download. A container registry, however, has some drawbacks. The performance of a system may suffer because all of the hosts or workers are downloading the images from the same registry.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for containers and container related operations. In general, example embodiments of the invention relate to sharing containers or to a peer-to-peer file system that allows hosts to share containers with other hosts.

Embodiments of the invention relate to a container filesystem that allows containers to be shared more efficiently and effectively amongst hosts and in a computing network. Rather than sharing files using a filesystem such as network filesystem (NFS), embodiments of the invention allow hosts (e.g., nodes or servers) in a system to each operate as an image server and/or a client. This eliminates the need for a centralized or dedicated image registry or image server, although an image registry could still be provided. The ability to share containers using peer relationships allows for improved download speed, better availability, and improved scalability.

Embodiments of the invention relate to a peer container filesystem that facilitates container related operations such as, but not limited to, downloading containers, sharing containers, reading/writing containers and container related files, and storing containers. The container filesystem is configured such that hosts can share containers or portions of containers (e.g., layers or files) with other hosts. This allows a host to obtain a container image or portion thereof from another host rather than from an image registry. Because hosts can obtain images from other hosts, network traffic to a centralized image registry is reduced. Embodiments of the invention provide methods for distributing images amongst the various hosts or nodes of the network.

In addition, embodiments of the container filesystem allow downloading and running a container image to be a stream-like process. By monitoring and determining the order in which different layers/files in a container are accessed during container execution, the container image can be downloaded in a manner that allows the container to begin running before the entire image is downloaded. Once the required files are downloaded, execution can begin. Other files of the image that are needed later can arrive later and while the container is running. A container filesystem that allows container images to be streamed and started prior to completing the download improves effective download times, startup times, and the like. This also allows a host to access portions or files of the same image from different hosts if necessary or if available.

Figure 1A:
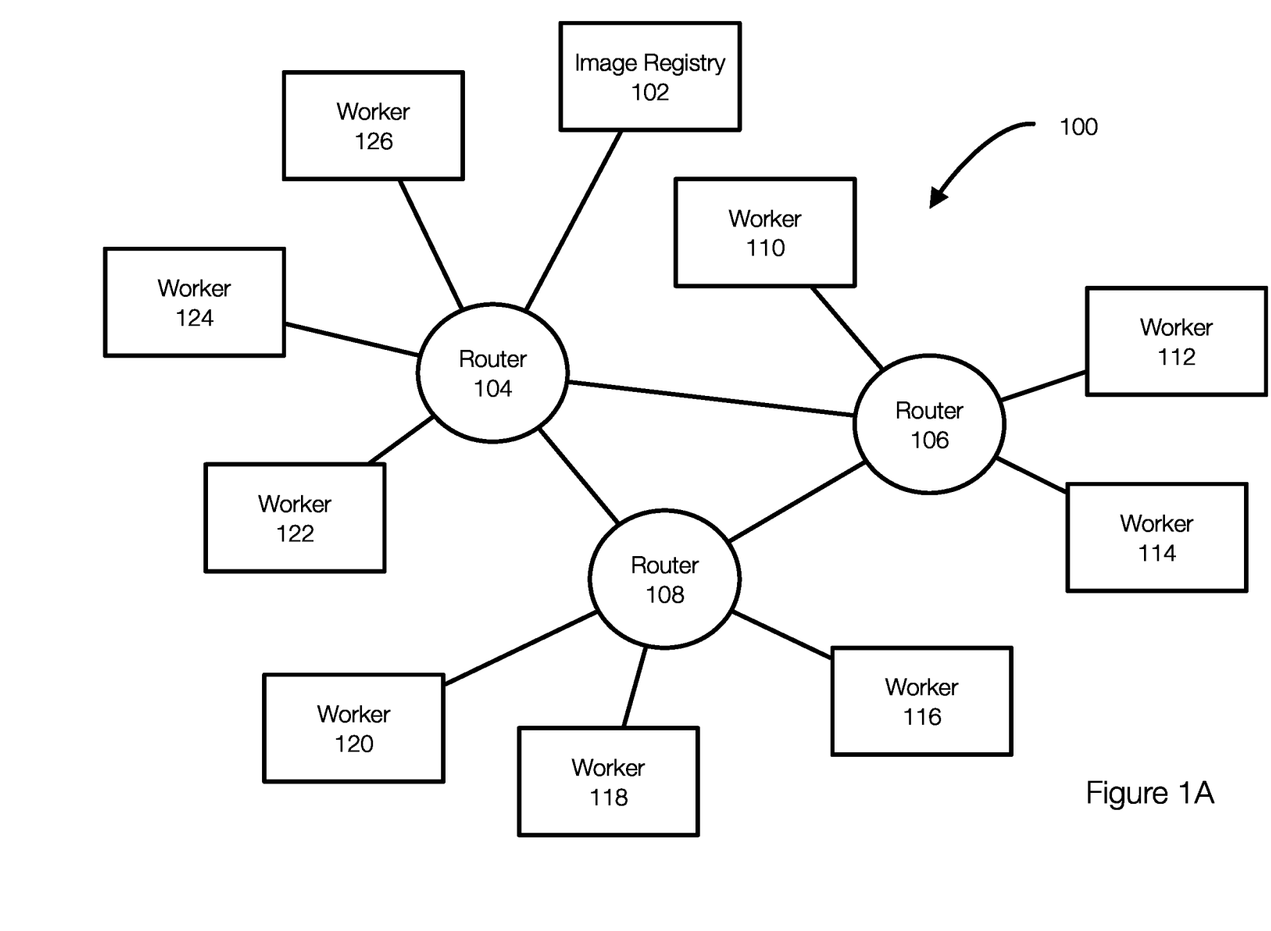
FIG. 1A discloses aspects of a network that includes workers configured to run containers.

FIG. 1A illustrates an example of a network in which container images can be downloaded and executed. FIG. 1A illustrates a network 100 that includes an image registry 102 that stores a library or catalog of container images. FIG. 1A illustrates workers, which are examples of hosts or nodes in the network. Nodes or hosts include, but are not limited to, computing devices or other hardware and are represented by workers 110, 112, 114, 116, 118, 120, 122, 124, and 126. The network 100 may include routers (represented by routers 104, 106, and 108) that allow the workers to communicate with the image registry 102. A worker is an example of a host or node and may be physical or virtual in nature.

In order to run a container, the image of the container needs to be presented (e.g., downloaded) to a worker (e.g., a node in the network). The worker, to run the container, must build the image or download the image from the image registry 102. When multiple images are being pushed or pulled from the image registry 102 by different workers at the same time, the download speed is likely reduced. Further, FIG. 1 illustrates that all communications in this example, go through the router 104, which is another potential bottleneck.

When containers are used for FaaS (Functions as a Service) or in a serverless platform, the speed of starting a container is often critical and the arrangement in FIG. 1A may not allow the optimum start up speed to be achieved. Even if the network shown in FIG. 1A is adapted to include replicas and a content delivery network, these adaptations introduce additional cost.

Next, if the image registry 102 experiences problems or is down, the entire platform or network 100 may be affected adversely. If a cluster or group of workers (e.g., workers 112, 114, and 116) cannot connect to the image registry 102, the platform or portion of the platform may fail even if the image needed by the worker 112, for example, is present on the worker 114.

The image registry 102 may store large numbers of container images and each container image may range in size from hundreds of megabytes to gigabytes. Storing hundreds of thousands of container images requires substantial storage resources. The addition of more image registries would require even more storage and would incur additional cost.

Duplicate files are also a problem in the network 100 and the image registry 102. For example, there are a lot of different distributions of Linux (Ubuntu, Redhat, SUSE, etc.) and each distribution has many releases. However, the images of these distributions may share a lot of the same files. Because a container is self-contained, this results in the same file being stored many times in the image registry 102, which consumes storage resources. In addition, a container such as a Linux container may have a lot of files that are identical to the files on a Linux host machine. Downloading files that already exist consumes both time and resources.

Embodiments of the invention relate to a peer container filesystem that allows containers to be shared using peer-to-peer protocols such as IPFS and BitTorrent.

Figure 1B:
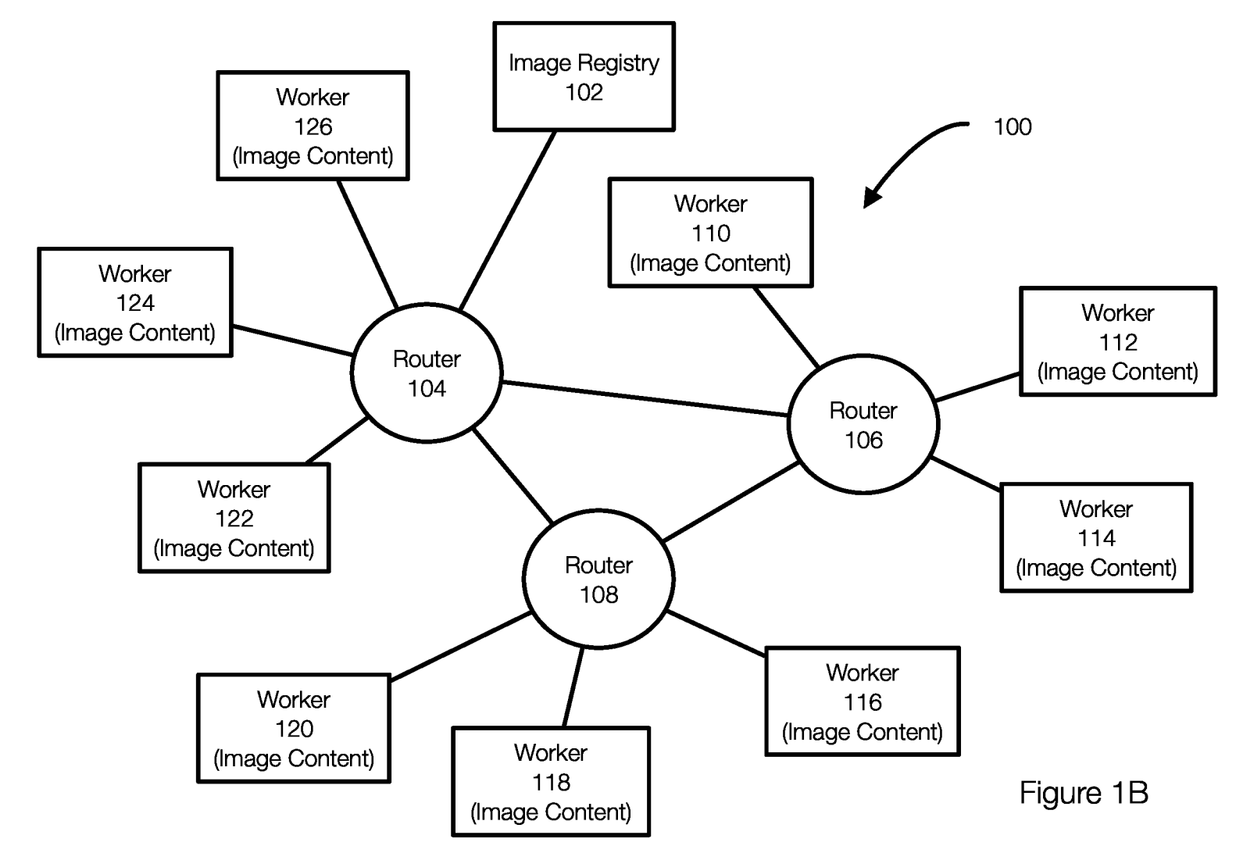
FIG. 1B discloses aspects a computing environment that includes a peer-to-peer container filesystem.

FIG. 1B illustrates the same network 100. In FIG. 1B, the peer container filesystem is implemented such that at least some of the workers locally store container images or portion thereof (e.g., image content). The container filesystem thus allows, for example, the worker 112 to obtain a container image or portion thereof from its local store or from other workers in the network 100. The workers shown in FIG. 1B no longer rely on an image registry 102, although the image registry 102 can still be used in embodiments of the invention.

Figure 1C:
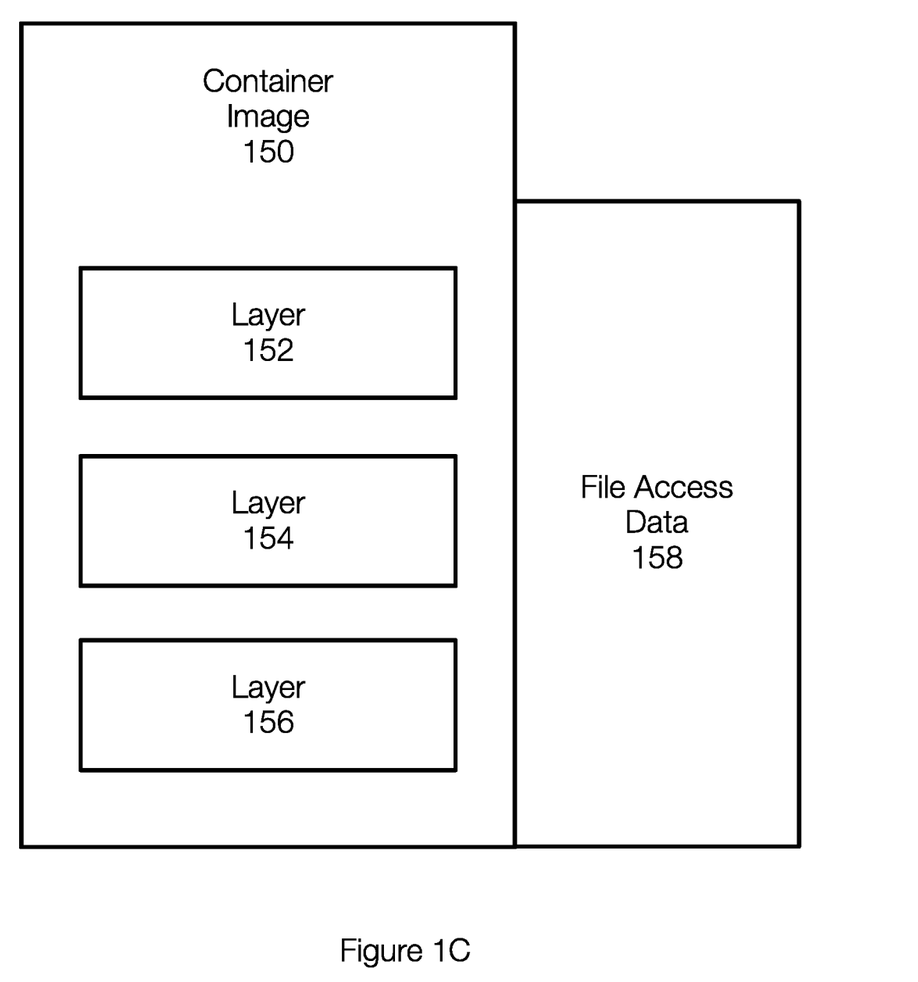
FIG. 1C illustrates an example of a container that may be used in a peer-to-peer container file system.

FIG. 1C illustrates an example of a container in accordance with embodiments of the invention. FIG. 1C illustrates a container image 150 that includes layers 152, 154, and 156. When the container is built, the layers 152, 154, and 156 are packaged together into the container image 150.

The container image 150 is also associated with file access data 158. Embodiments of the invention may run containers in a test environment or monitor the execution of actively deployed containers. More specifically, the execution of the container is monitored such that the order in which the files included in the container are accessed is recorded. The file access data 158 includes at least the order in which the files of the container are accessed. The file access data 158 may also identify files that are not accessed in previous executions. The file access data 158 may also identify which files are required to start the container.

The file access data 158 can be used by the container filesystem. As previously stated, embodiments of the invention may allow a container to be streamed. Stated differently, execution of the container may start before the entire image is downloaded to a worker. The file access data 158 allows the container filesystem to prioritize the order in which files are requested from peer workers. Files (or layers) that are needed based on the file access data 158 may be requested first. This can improve the start time. For example, the require files are downloaded first so that execution can start. The remaining files can be downloaded after execution has begun.

Figure 2:
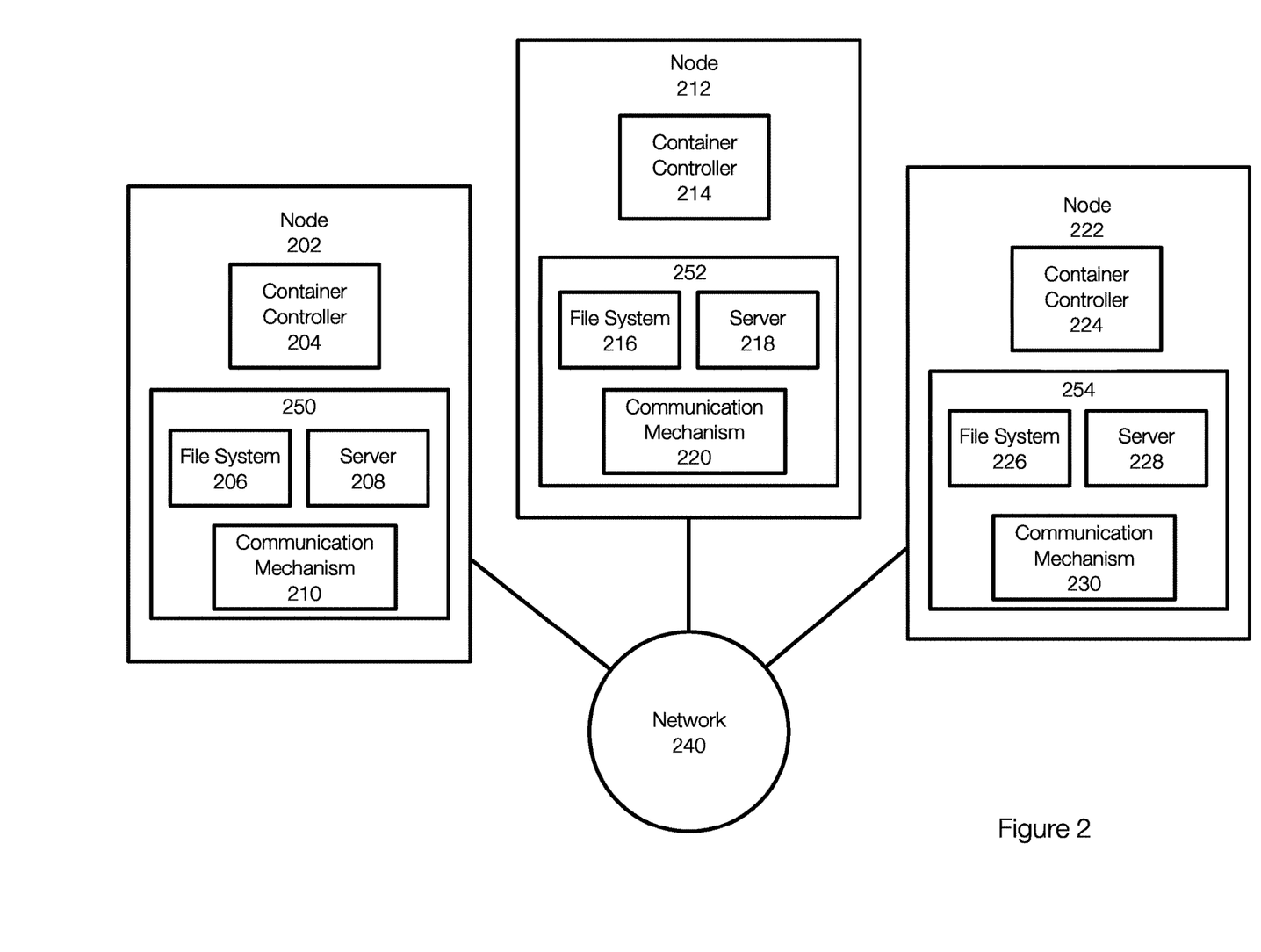
FIG. 2 illustrates examples of peer nodes in a network that implement a peer-to-peer container file system.

FIG. 2 illustrates an example of a container platform implemented in a network. The network 240 includes, but is not limited to, nodes 202, 212 and 222. The nodes 202, 212, and 222 are similarly configured in this example and represent a plurality of nodes. The nodes are examples of workers or hosts and may be physical nodes or virtual nodes that include or are allocated various hardware such as processors, network adapters, memory, storage, and the like.

The nodes 202, 212, and 222 implement a container filesystem that can be viewed from the perspective of a node and/or from the perspective of the network. The peer container filesystem 250 allows a node to access container images or portions thereof stored by other nodes in the network 240. The container file systems 250, 252, and 254 allow the nodes 202, 212, and 222 to share container images in the network 240. The container file system allows the nodes 202, 212, and 222 in the network 240 to act, collectively, as an image registry where the images are distributed among the nodes of the network 240. The container file systems 250, 252, and 254 cooperate to share container images or portions thereof in a peer-to-peer manner. This may eliminate bottlenecks, for example, to an image registry server.

The node 202 includes a container controller 204 and the peer container filesystem 250. The container controller 204 may be part of the peer container filesystem 250. The nodes 212 and 222 include, respectively, peer container filesystems 252 and 254 and container controllers 214 and 224. The peer container filesystem 250 includes a filesystem 206 (may also be referred to herein as a peer container file system or container filesystem), a server 208, and a communication mechanism 210. The peer container filesystems include, respectively, file systems 216 and 226, servers 218 and 228, and communication mechanisms 220 and 230.

The node 202 may also be associated with storage configured to store container images or portions thereof that are downloaded to the node 202. The container controller 204 is configured to manage containers, including container lifecycles, container execution, and the like. The container controller 204, for example, may determine which container images are persisted locally, when to eject a container image from the node, and the like. The container controller 204 is configured to communicate with the server 208 to download an image (e.g., download files of an image) from the network 240 or, more specifically, from one or more of the other nodes 212 and 222 in the network 240.

When a container image is needed or starts, the container controller may send a request to download files to the server 208. The server 208 may begin downloading files from the peer nodes 212 and 222 (or other nodes in the network). When the required files are downloaded (not necessarily the entire image—only the files needed to start execution), the container controller 204 can start the container. The server 208 may continue to download the remaining files of the requested image.

In some instances, the server 208 may not receive a response from the other nodes 212 and 222 (or from the servers 218 and 228). In this case, the server 208 may seek the files from an image registry server if present. If there is no image registry server, the container controller 204 may indicate an error that the image cannot be obtained.

The file system 206 may provide an interface accessible by at least the operating system. The file system 206 is configured to operate with other file systems that can work with, for example, block devices. For example, when a write operation is received from the operating system, the file system 206 will write to the default file system such as ext4 to Linux or NTFS to Windows. However, the location of the file to be written may not be the same as the location requested or supplied by the operating system. the file system 206 may use a hash value of the file to be written to locate the file on the default file system to which the file is written.

When a read operation occurs, the file system 206 will look for the file on the default file system by its hash value initially. If the file is available, the file system 206 will return the file. If the file being read is not available, the file system 206 may broadcast a request to the network 240 with the hash of the file in the request. A body in the request may provide other information specific to the type of the request. The servers 218 and 228, for example, may respond to the request.

Figure 3:
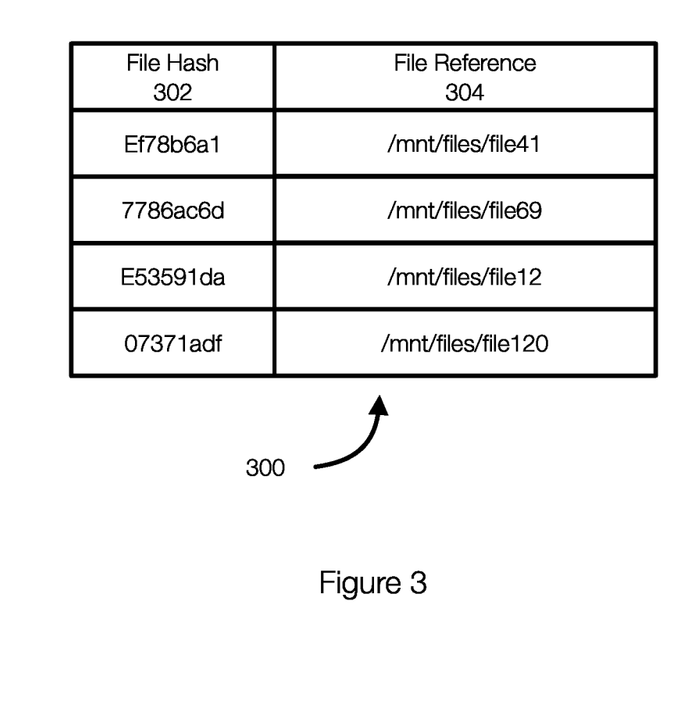
FIG. 3 illustrates an example of a table used in a peer-to-peer container file system.

The file system 206 or, more generally, the peer container filesystem 250, may store or have access to tables that are used to access the files locally and/or request files from other nodes. FIG. 3 illustrates an example of a key value table. By way of example only, the table 300 stores key value pairs that include a hash 302 and a file reference 304. The table 300 thus identifies the image files stored locally.

Figure 4:
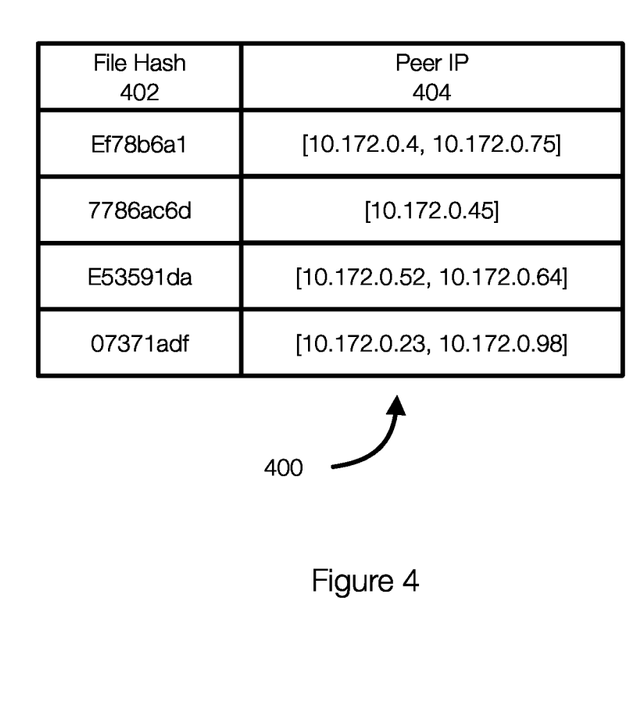
FIG. 4 illustrates another example of a table used in a peer-to-peer container file system.

FIG. 4 illustrates an example a key value table. By way of example, the table 400 is a distributed hash table (DHT). By way of example only, the table 400 stores key value pairs that include a hash 402 and a peer IP 404. The table 400 identifies which peers store which files. In some embodiments, the tables may not be exhaustive and list every possible file and file location. The peer container filesystem, however, can also search for the files by broadcasting a request or search for a file. A response may be received from any of the peers having the file or knowing the location of the file.

Thus, when a read operation is performed, the file system 206 looks for the file by its hash value using, for example, the table 300. If the file is available locally (e.g., at the node 202), the file corresponding to the hash is returned. If the file is not present at the node 202 (or the node's storage), the server 208 may broadcast a request using the table 400. The broadcast from the server 208 to other nodes in the network 240 includes the hash of the needed file and may be broadcast to the peers identified in the table 400 and/or to other nodes in the network 240.

Figure 5:
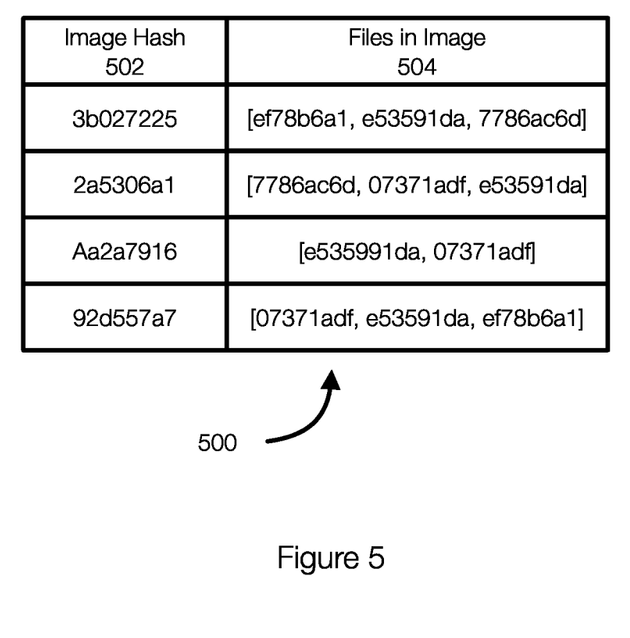
FIG. 5 illustrates another example of a table used in a peer-to-peer container file system.
Figure 6:
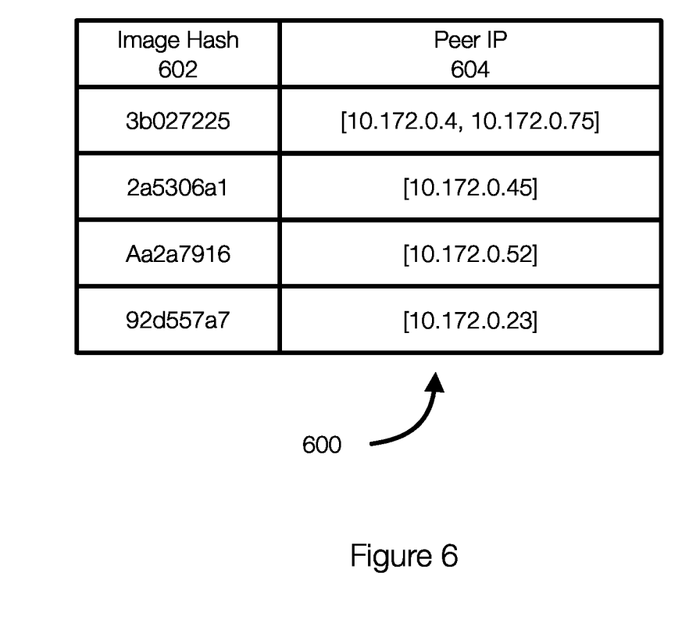
FIG. 6 another example of a table used in a peer-to-peer container file system.

FIG. 5 illustrates a key value table. The table 500 includes, by way of example only, key value pairs including an image hash 502 and filed in an image 504. FIG. 6 illustrates a key value table. The table 600 includes, by way of example only, key value pairs including an image hash 602 and peer IP 604. The tables 500 and 600 are similar to the tables 300 and 400 and allow the node 202 to find images on the local node 202 and/or on the peer nodes in the network 240. With regard to the table 500, the files in the image 504, the files may be listed in the order in which they are accessed.

Returning to FIG. 2, the server 208 may be configured to listen for requests according to a protocol, such as a protocol associated with the peer container filesystem 250. The requests may originate from the node 202 or from external nodes in the network such as the nodes 212 and 222. The server 208 may be configured to respond to those requests, whether received from the container controller 204 (the node 202) or from another node or container controller in the network 240. The server 208 may also access and maintain/update the tables such as shown in FIGS. 3-6.

The communication mechanism 210 is based on the protocol of the peer container filesystem. The communication mechanism 210 allows the file system 206 or the peer container filesystem 250 to download a requested file that is not present on the node 202. The file can be retrieved from any server (e.g., nodes 218 and/or 228) within the network 240. The communication mechanism can coordinate the process of downloading a file from one of the nodes or from multiple nodes in parallel.

Figure 7:
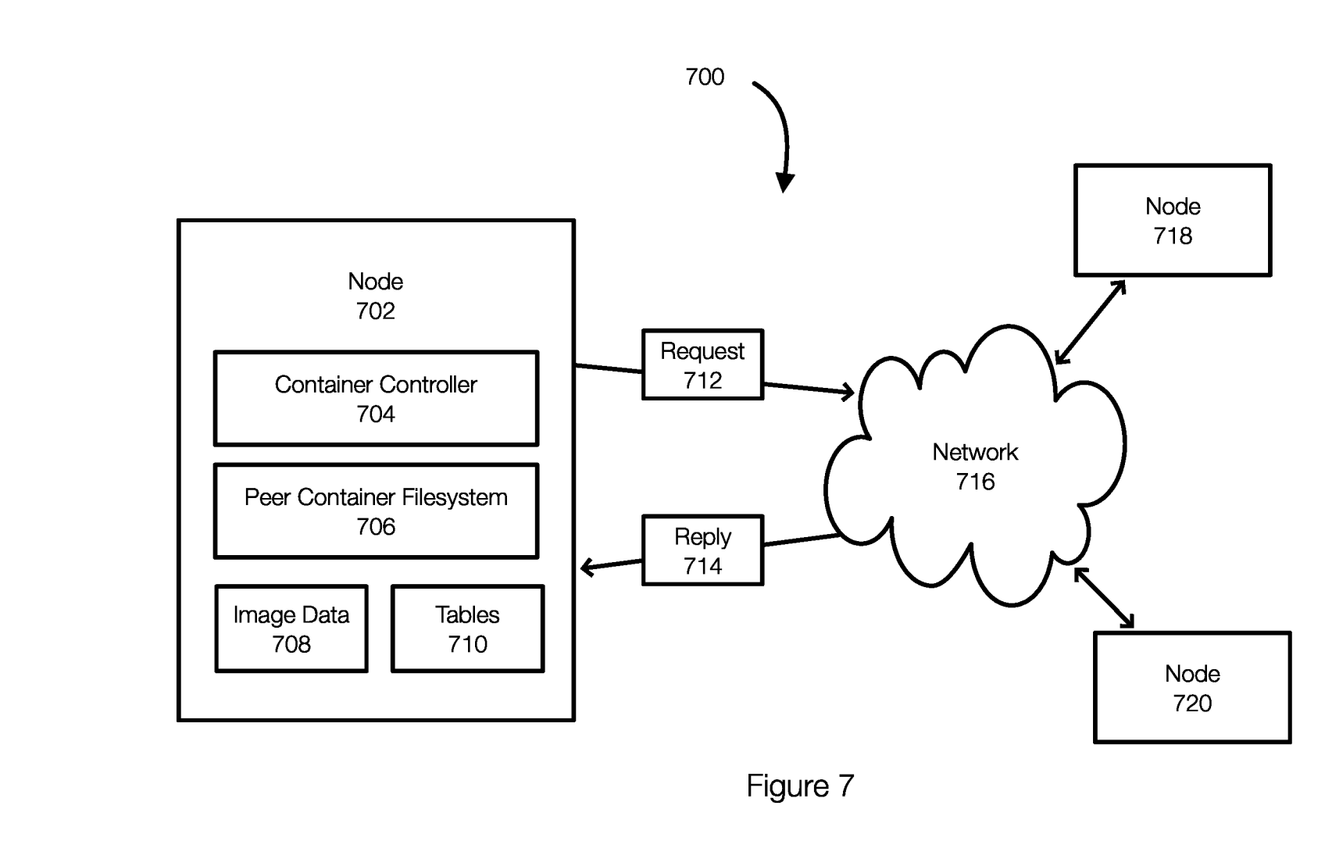
FIG. 7 illustrates examples of requests associated with a peer-to-peer container file system.

FIG. 7 illustrates an example a peer container filesystem operating in a network. The network 700 includes peer nodes 702, 716, and 718. These nodes may be configured to execute containers and may each provide individually or collectively a container orchestration environment.

In this example, the node 702 is an example of the node 202. The node 702 includes a container controller 704 and a peer container filesystem 706. The container controller 704 may also be part of the peer container filesystem 706.

The node 702 may store image data 708. The image data 708 may include images and/or portions or images such as files or layers. The node 702 may also store tables for the peer container filesystem such as those illustrated in FIGS. 3-6. The files associated with the image data 708 and the images includes in the image data 708 are typically identified in the tables 300 and 500.

The peer container file system 706 allows a node to perform various tasks related to images or files of images that may be stored on nodes in the network 716. For example, the peer container filesystem 706 can participate in the distribution of a container image or files thereof. If the image data 708 includes an image, for example, that image can be pushed to other nodes in the network 716.

The peer container filesystem may share files or perform file system related operations using requests. For example, the peer container filesystem may issue a request 712 to perform various filesystem related tasks or functions. Using the protocol of the peer container filesystem, the request 712 may be sent to an address such as ipcfs://HASH_VALUE. The hash value is replaced by the hash of the image or file that is the subject of the request. The body of the request may use an array of key-value pairs.

In order to push an image to other nodes in the network, a request may be broadcast to the network 716. The request 712 may be ipcfs://7dfcf2e2 with body: type: availability, source: 10:172.0.34. This would notify other nodes, including the nodes 718 and 720, that the node 702 has an image (or file(s)) that are stored locally. The request 712, which is a push request in this example, checks to determine whether any peer in the network also has the same image and how much storage is available on nodes that do not store the image.

If the peer node 718 has the image, the peer 718 can send a reply 714 of yes. If the node 718 does not have the image stored locally, the reply 714 includes the storage available at the node 718. The node 720 may respond similarly. After the replies have all been received or after a period of time, the node 702 may act on the data in the replies. For example, if a sufficient number of nodes already store the image, there may be no need to push the image to the network 716 or, more specifically, to other nodes in the network. If an insufficient number of nodes store the image, the node 702 (more specifically the server of the peer container filesystem 706) would select peers having the most storage available and send another request to those peers. This second request may cause the selected peers to pull the image from the node 702 with a pull request. Alternatively, the image can simply be pushed to certain nodes. This allows the image to be stored on at least a minimum number of nodes in the network 716. The minimum acceptable number of nodes may be predetermined and may be set manually, as a percentage of nodes, or in another manner.

If the node 702 does not have an image, the request 712 may constitute a search request. The body of the request may have a type of image and a method of list and source. The search request is broadcast to the network to check whether any of the other nodes store the image identified in the request (e.g., ipcfs://19c7c12a). In one example, the node 702 may search the image data 708 first prior to sending the search request.

If the node 720 has the image that is the subject of the request, the reply 714 may include a list of files that are required to start a container from this image to the requesting node. The node 702 can then begin to pull the files in a particular order such that the start time is reduced and such that the image can be started before the entire image is downloaded. In addition, the list of files allows the node 702 to determine whether any of the files are present in the image data 708. Embodiments of the invention allow running container instances to share files and/or layers when present.

The request 712 may also be a download file request or a pull request. This request is typically sent to the servers that responded to the search request or other relevant request.

The request 712 may also be an update request. This request is broadcast to the network and allows the other servers or nodes to update their tables. For example, if the node 702 downloads a file or an image from the node 720, the update request allows the nodes 718 and 720 to update their tables to reflect that the image is stored on the node 702.

In an embodiment, the tables may allow the node 702 to identify the locations of files or images and can be used in conjunction with the requests or as part of the requests. For example, a node may check its own image data prior to sending out a request.

The peer container filesystem can eliminate the need to provide or set up an image registry. The nodes collectively act as an image registry. The peer container filesystem can eliminate single points of failure and also increase the download of files due to the peer-to-peer protocols.

In addition, the downloads can be performed in an ordered manner (e.g., based on order of access) because the order in which files of a container are accessed are attached to the containers. This allows a node to prioritize which files to download first.

Each node can act as a worker or host and an image server. This eliminates single points of failure in the network and ensures that the platform operates even when a node fails. The network traffic is more evenly distributed as well when images or portions thereof can be retrieved from peer nodes.

The peer container filesystem can be used to find the right file, which may be stored in different filesystems or locations in the network. The hash value generated by applying a hash algorithm remains the same until the file or image is changed. Using a hash value to locate and store a file ensures that the same file can be stored a single time locally and allows the file to be referenced and located in different filesystems and locations.

For example, a datacenter belongs to a bank and the bank may require compute intensive jobs to be performed, such as a recommendation service that will analyze the user purchase history and make a list of offers for the user based on his/her current location or other information. The bank may adopt an application runtime environment (e.g., Docker and Kubernetes) that can run containers.

Embodiments of the invention can provide a compute node (e.g., a PowerEdge R940xa) as the host machine running compute intensive jobs, and a storage enhanced node, such as PowerEdge R7425 with SC All-Flash connected, as a worker node storing container images. There could be several nodes deployed as master nodes and the rest can be deployed as worker nodes. In this example, the worker nodes can install the peer container file system. The master nodes could also install the peer container file system. When initializing these nodes, Table A would be built while initializing the peer container filesystem on the nodes.

The bank's development team will build an image and then push the image to the worker nodes using the protocol discussed herein. Once the pushing process is finished, some of the worker nodes would have the image on their storage and have the hash tables mentioned in the disclosure built and maintained.

When a data analyst wants to run the newest version of the image with the updated recommendation algorithm with some generated user data, this data analyst only needs to fill a deployment template for this recommendation service with the user data location to deploy this container.

The container may run on a worker node where the image is not present. In this case, the container controller would send a request to the server on the same node and wait for the server to download the required files from peers to start the container. The server sends a broadcast request to all peers in the network and, if any peer has the requested image (or portion thereof), that peer will generate a tracker file with information of required files' hashes and IPs of peers having this image. Then, the peer will return the tracker file back to the original worker node.

The worker node will use the first received tracker file to initialize the downloading process using a peer-to-peer protocol such as BitTorrent. The worker node may download from all peers having this image and follow the sequence of files accessed during the simulation run of the container. After the required files are ready, the container controller would start the container. Meanwhile, the server will continuously download the rest files until all files are presented on the worker node.

Figure 8:
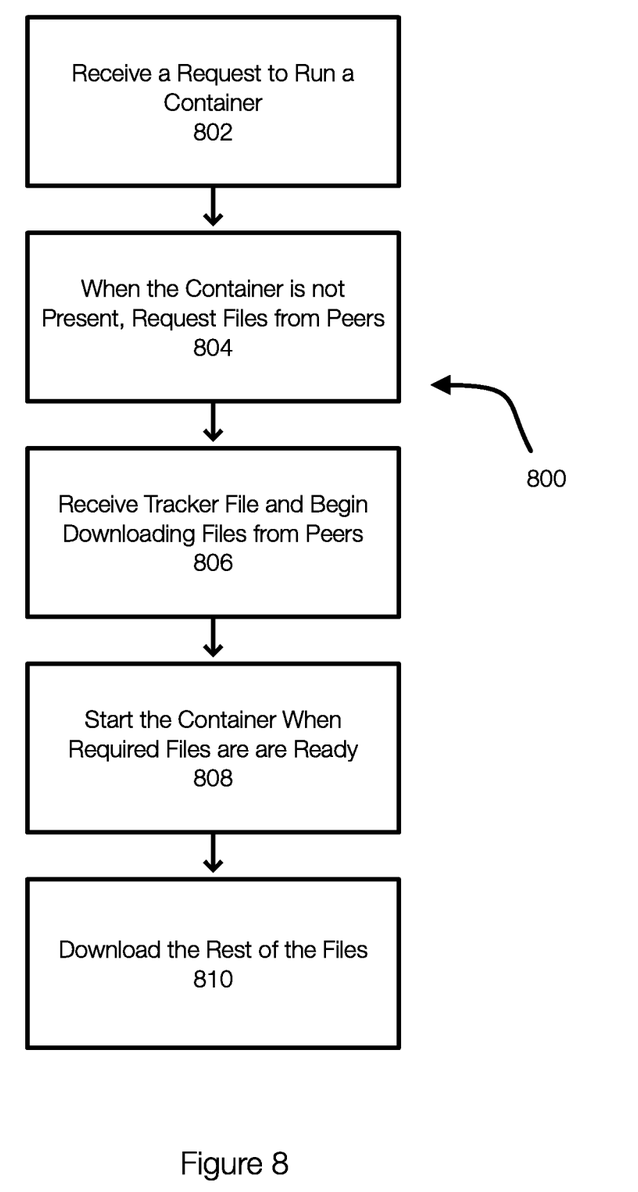
FIG. 8 illustrates an example method for orchestrating a container using a peer container filesystem.

FIG. 8 illustrates an example of a method for running a container on a node. The method 800 may begin, by way of example, by receiving 802 a request a request to run a container. The request may be received by a node of a network of nodes that are configured to run containers. The request to run a container may be generated by a user that fills a deployment template or in another manner.

If the container is not present on the node that received the request, the container (or the files thereof) may be requested 804 from peer nodes. The request may be a search requests to determine which nodes have the files or a download request if a node is already node. The node may maintain tables that may identify locations of the files and/or of the image on the nodes of the network.

The node may receive 806 a tracker file from at least one of the peer nodes that has the file. The tracker file may include a list of files for the container and their hashes and the IPs of nodes that have this image. The node may use the first received tracker file to initialize the downloading process. The downloading process follows the order identified in the file access data, which was generated during a simulation run. The downloading process may download the files that are required to start the container (required files).

The container is then started 808 when the required files are downloaded and ready. As the container runs, the rest of the files are downloaded 810. In addition, the node may share the image with other nodes (e.g., using a push request and a pull request) as described herein.

Figure 9:
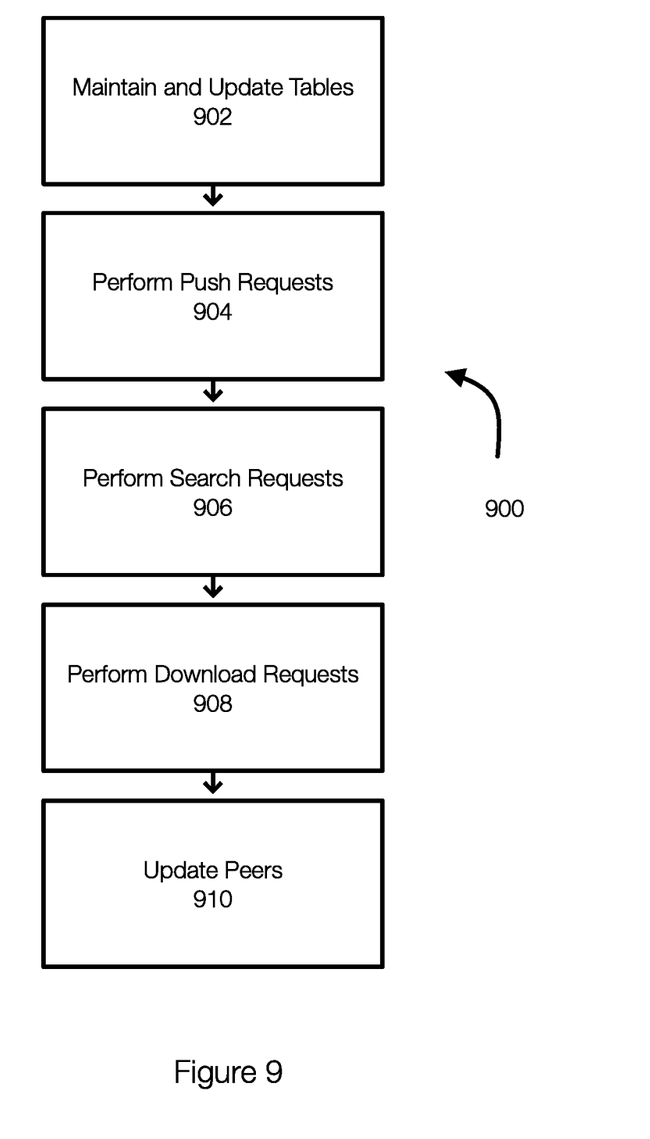
FIG. 9 illustrates an example method for performing peer container filesystem operations.

FIG. 9 illustrates an example of a method for sharing containers in a network. The method 900 may be performed by each of the nodes (e.g., by the peer container filesystem) in the network and is an example of an operating peer container filesystem configured to share images in a network.

Initially, tables are maintained and updated 902 at the nodes. The tables include key value pairs that allow locations of files and/or images on a node or in a network of nodes. These tables allow files and images to be located locally and in the network. Push requests are performed 904. The push requests are configured to distribute files and/or images in the network.

Search requests are performed 906. A search request is broadcast to the network to determine whether an image or file is located in the network. This may be used in addition to the tables.

Download requests are also performed 908. A node can download files and images from other nodes. Peers are updated 910. When a node receives a new image and updates its tables, this information can be sent such that the other peers can update their tables as well. The method 900 is a process that is ongoing at least because images are often updated, deleted, executed in new locations, and the like. The peer container file system can ensure that any delays are reduced and ensure that there is no single point of failure.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, container related operations. Such container related operations may include sharing operations, broadcast operations, search operations, push operations, update operations, download operations, and the like.

At least some embodiments of the invention provide for the implementation of the disclosed functionality in existing backup platforms. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method comprising: receiving a request to run a container on a node in a network, the node including a peer container filesystem and a container controller, the container associated with a container image, requesting files associated with the container from peer nodes when the files are not present at the node, receiving a tracker file from a peer node that identifies required files to start the container, downloading the required files from at least one of the peer nodes, starting the container when the required files are downloaded, and downloading second files from the peer nodes, wherein the second files are not required to be downloaded prior to starting the container on the node.

Embodiment 2. The method of embodiment 1, further comprising determining whether any of the files are present on the node before requesting the files from the peer nodes using a key-value table.

Embodiment 3. The method of embodiment 1 and/or 2, wherein the tracker file includes file access data that identifies files used by the container and an order in which the files are accessed, and identifies the required files.

Embodiment 4. The method of embodiment 1, 2, and/or 3, further comprising sharing the container with the peer nodes.

Embodiment 5. The method of embodiment 1, 2, 3, and/or 4, further comprising performing file system operations associated with the peer container filesystem.

Embodiment 6. The method of embodiment 1, 2, 3, 4, and/or 5, further comprising pushing an image to other nodes in the network, wherein the images are pushed to a minimum number of nodes.

Embodiment 7. The method of embodiment 1, 2, 3, 4, 5, and/or 6, wherein the image is pushed to nodes having the most available storage.

Embodiment 8. The method of embodiment 1, 2, 3, 4, 5, 6, and/or 7, further comprising searching for an image by sending a broadcast request to the peer nodes for the image, wherein the image is identified by a hash.

Embodiment 9. The method of embodiment 1, 2, 3, 4, 5, 6, 7, and/or 8, further comprising downloading an image or files of an image from one of the peer hosts.

Embodiment 10. The method of embodiment 1, 2, 3, 4, 5, 6, 7, 8, and/or 9, further comprising updating the peer nodes with information that identifies which files and images are stored by the node.

Embodiment 11. The method as recited in any of embodiments 1 to 10 or portions thereof.

Embodiment 12. A method for performing any of the operations, methods, or processes, or any portion of any of these, disclosed herein.

Embodiment 13. A non-transitory storage medium having stored therein instructions that are executable by one or more hardware processors to perform the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not a comprise an element of other hardware, such as the computing devices and systems a disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

An example physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a request to run a container on a node in a network, the node including a peer container filesystem and a container controller, the container associated with a container image, wherein an order in which files associated with the container are accessed during container execution has been previously recorded and associated with the container, wherein the order is stored in a tracker file;
requesting the files associated with the container from peer nodes when the files are not present at the node;
receiving the tracker file from a peer node, wherein the tracker file identifies files required to start the container execution;
downloading the required files from at least one of the peer nodes;
starting the container when the required files are downloaded; and
downloading second files identified in the tracker file from the peer nodes based on the order of the second files, wherein the second files are not required to be downloaded prior to starting the container on the node, wherein downloading the second files is initiated prior to the second files being needed for the container execution.

2. The method of claim 1, further comprising determining whether any of the files are present on the node before requesting the files from the peer nodes using a key-value table.

3. The method of claim 1, wherein the tracker file includes file access data that identifies the files used by the container and the order in which the files are accessed, and identifies the required files.

4. The method of claim 1, further comprising sharing the container with the peer nodes.

5. The method of claim 1, further comprising performing file system operations associated with the peer container filesystem.

6. The method of claim 5, further comprising searching for an image by sending a broadcast request to the peer nodes for the image, wherein the image is identified by a hash.

7. The method of claim 5, further comprising downloading an image or files of an image from one of the peer hosts.

8. The method of claim 5, further comprising updating the peer nodes with information that identifies which files and images are stored by the node.

9. The method of claim 5, further comprising pushing an image of the container to other nodes in the network, wherein the images are pushed to a minimum number of nodes.

10. The method of claim 9, wherein the image is pushed to nodes having the most available storage.

11. A non-transitory storage medium having stored therein instructions that are executable by one or more hardware processors to perform operations comprising:
receiving a request to run a container on a node in a network, the node including a peer container filesystem and a container controller, the container associated with a container image, wherein an order in which files associated with the container are accessed during container execution has been previously recorded and associated with the container, wherein the order is stored in a tracker file;
requesting the files associated with the container from peer nodes when the files are not present at the node;
receiving the tracker file from a peer node, wherein the tracker file identifies files required to start the container execution;
downloading the required files from at least one of the peer nodes;
starting the container when the required files are downloaded; and
downloading second files identified in the tracker file from the peer nodes based on the order of the second files, wherein the second files are not required to be downloaded prior to starting the container on the node, wherein downloading the second files is initiated prior to the second files being needed for the container execution.

12. The non-transitory storage medium of claim 11, further comprising determining whether any of the files are present on the node before requesting the files from the peer nodes using a key-value table.

13. The non-transitory storage medium of claim 11, wherein the tracker file includes file access data that identifies the files used by the container and the order in which the files are accessed, and identifies the required files.

14. The non-transitory storage medium of claim 11, further comprising sharing the container with the peer nodes.

15. The non-transitory storage medium of claim 11, further comprising performing file system operations associated with the peer container filesystem.

16. The non-transitory storage medium of claim 15, further comprising searching for an image by sending a broadcast request to the peer nodes for the image, wherein the image is identified by a hash.

17. The non-transitory storage medium of claim 15, further comprising downloading an image or files of an image from one of the peer hosts.

18. The non-transitory storage medium of claim 15, further comprising updating the peer nodes with information that identifies which files and images are stored by the node.

19. The non-transitory storage medium of claim 15, further comprising pushing an image of the container to other nodes in the network, wherein the images are pushed to a minimum number of nodes.

20. The non-transitory storage medium of claim 19, wherein the image is pushed to nodes having the most available storage.

* * * * *